US012771194B2

(12) United States Patent
Kmiec et al.

(10) Patent No.: US 12,771,194 B2
(45) Date of Patent: Oct. 20, 2026

(54) ROTOR FOR AN ELECTRIC MOTOR PROVIDED WITH A COOLING CIRCUIT

(71) Applicant: NOVARES FRANCE, Velizy-Villacoublay (FR)

(72) Inventors: Eric Kmiec, Fresnicourt le Dolmen (FR); Nicolas Dargere, Marco en Baroeul (FR); Cédric Ledieu, Mont Saint Eloi (FR)

(73) Assignee: NOVARES FRANCE, Velizy-Villacoublay (FR)

( * ) Notice: Subject to any disclaimer, the term of this patent is extended or adjusted under 35 U.S.C. 154(b) by 166 days.

(21) Appl. No.: 18/854,659

(22) PCT Filed: Mar. 29, 2023

(86) PCT No.: PCT/FR2023/050452

§ 371 (c)(1),
(2) Date: Oct. 7, 2024

(87) PCT Pub. No.: WO2023/194675

PCT Pub. Date: Oct. 12, 2023

(65) Prior Publication Data

US 2025/0357810 A1 Nov. 20, 2025

(30) Foreign Application Priority Data

Apr. 7, 2022 (FR) ..................................... 22/03195

(51) Int. Cl.
*H02K 1/32* (2006.01)
*H02K 1/02* (2006.01)
(Continued)

(52) U.S. Cl.
CPC ................. *H02K 1/32* (2013.01); *H02K 1/02* (2013.01); *H02K 1/276* (2013.01); *H02K 7/003* (2013.01); *H02K 9/19* (2013.01)

(58) Field of Classification Search
CPC .......... H02K 1/27; H02K 1/274; H02K 1/276; H02K 1/32
(Continued)

(56) References Cited

U.S. PATENT DOCUMENTS

2019/0181709 A1 6/2019 Berendes et al.
2020/0036248 A1 1/2020 Krais et al.
2020/0036249 A1 1/2020 Krais et al.

FOREIGN PATENT DOCUMENTS

DE 102011121042 A1 6/2012
DE 102017009713 A1 4/2018
(Continued)

OTHER PUBLICATIONS

DE-102017223824-B4 machine translation (Year: 2017).*
(Continued)

*Primary Examiner* — Oluseye Iwarere
*Assistant Examiner* — Minki Chang
(74) *Attorney, Agent, or Firm* — CANTOR COLBURN LLP

(57) ABSTRACT

The present disclosure relates to a rotor for an electric motor, including: —a rotor shaft mounted so as to rotate about an axis; —a stack of laminations mounted coaxially on the rotor shaft, said stack of laminations including internal cavities housing permanent magnets; —a front flange and a rear flange mounted coaxially on the rotor shaft and arranged axially on either side of the stack of laminations so as to be contiguous with the front and rear side faces, respectively, of the stack of laminations; —flow channels for a cooling fluid, which are formed respectively inside the shaft, the front and rear flanges, and the permanent magnets.

20 Claims, 6 Drawing Sheets

(51) Int. Cl.
*H02K 1/276* (2022.01)
*H02K 7/00* (2006.01)
*H02K 9/19* (2006.01)

(58) Field of Classification Search
USPC .................................................... 310/52–65
See application file for complete search history.

(56) References Cited

FOREIGN PATENT DOCUMENTS

| | | | | |
|---|---|---|---|---|
| DE | 102018222634 A1 | | 6/2020 | |
| DE | 102019133532 A1 | | 6/2021 | |
| DE | 102020119549 A1 | * | 1/2022 | ............ H02K 1/276 |
| DE | 102017223824 B4 | * | 10/2025 | ........... H02K 1/2766 |
| EP | 2254221 A2 | | 11/2010 | |
| EP | 3661022 B1 | | 1/2022 | |
| FR | 3111025 A1 | | 12/2021 | |
| GB | 2562760 A | | 11/2018 | |
| JP | 2014093816 A | | 5/2014 | |

OTHER PUBLICATIONS

DE-102020119549-A1 machine translation (Year: 2020).*
International Search Report for Application No. PCT/FR2023/050452, dated May 26, 2023, 3 pages, English translation.
2 Written Opinion for Application No. PCT/FR2023/050452, dated May 26, 2023, 3 pages, English translation.

* cited by examiner

ROTOR FOR AN ELECTRIC MOTOR PROVIDED WITH A COOLING CIRCUIT

CROSS REFERENCE TO RELATED APPLICATIONS

This application is a National Stage of PCT Application No. PCT/FR2023/050452 filed on Mar. 29, 2023, which claims priority to French Patent Application No. 22/03195 filed on Apr. 7, 2022, the contents each of which are incorporated herein by reference thereto.

TECHNICAL FIELD

The present disclosure relates to a rotor for an electric motor arranged so as to allow for a better evacuation of the heat generated during operation thereof. The present disclosure also relates to an electric motor comprising such a rotor.

BACKGROUND

In general, current electric motors include a rotor secured to a shaft and a stator which surrounds the rotor. The stator is mounted in a casing which includes bearings for rotatably mounting the shaft. The rotor includes a body formed by a stack of laminations or pole wheels (claw pole) held in the form of a stack by means of a suitable fastening system. The body of the rotor includes inner cavities accommodating permanent magnets. The stator includes a body consisting of a stack of laminations forming a crown, whose inner face is provided with teeth delimiting in pairs a plurality of slots open onto the inside of the stator body and intended to receive phase windings. These phase windings pass through the slots of the stator body and form winding buns projecting on either side of the stator body. For example, the phase windings may consist of a plurality of U-shaped conductor segments, the free ends of two adjacent segments being connected together by welding.

In the rotor, the lamination stack is clamped axially between a front flange and a rear flange mounted coaxially with the shaft. Each flange is generally shaped as a disk extending in a radial plane perpendicular to the axis of the shaft. Each flange includes a central orifice for coaxial mounting on the shaft and several through holes intended to receive fastening screws axially crossing the entirety of the lamination stack, said screws being secured to the flanges by means of nuts. The front and rear flanges are generally formed of a thermally-conductive non-magnetic material, for example a metal.

In general, the casing includes front and rear bearings assembled together. The bearings define an inner cavity in which the rotor and the stator are accommodated. Each of the bearings centrally carries a ball bearing for rotatably mounting the shaft of the rotor.

During the operation of the motor, the induced magnetic flux flowing through the rotor generates a considerable heat which should be evacuated. There are currently several solutions for cooling the motor. One of these solutions, described in the French patent application FR 3 111 025, consists in making a cooling fluid flow throughout through cavities formed inside the lamination stack, these through cavities extending according to the axial direction of the rotor. This solution is particularly suitable for rotors provided with permanent magnets based on rare-earth elements disposed at the outer periphery of the lamination stack. Indeed, this position at the outer periphery of the permanent magnets offers enough space inside the lamination stack for the formation of the through cavities. However, this solution is not suitable for rotors provided with permanent magnets based on ferrite, which, because of their large volume, leave little space available to form through cavities inside the lamination stack.

BRIEF SUMMARY

Hence, the present disclosure aims to provide a rotor and an electric motor comprising such a rotor arranged so as to enable a better evacuation of the heat generated during operation thereof and devoid of the drawbacks of the previously-described existing solutions.

To this end, the present disclosure relates to a rotor for an electric motor including:

a rotor shaft rotatably mounted about an axis;

a lamination stack coaxially mounted on the rotor shaft, said lamination stack comprising inner cavities symmetrical with respect to the axis of the shaft and therebetween, said inner cavities axially crossing the entirety of the lamination stack such that they open, at one of their ends, at the level of a front lateral face of said lamination stack and, at another one of their ends, at the level of a rear lateral face of said lamination stack;

a plurality of permanent magnets accommodated inside the inner cavities of the lamination stack;

a front flange and a rear flange coaxially mounted on the rotor shaft and arranged axially on either side of the lamination stack so as to be contiguous respectively with the front and rear lateral faces of the lamination stack;

wherein the shaft is provided with at least one first inner channel for the circulation of a cooling fluid, so-called the inlet channel, and at least one second inner channel for the circulation of a cooling fluid, so-called the outlet channel, and wherein the front flange, respectively the rear flange, is configured to form with the front lateral face, respectively the rear lateral face, of the lamination stack at least one front connecting channel, respectively at least one rear connecting channel, inside which a cooling fluid can flow, said at least one front, respectively rear, connecting channel being in fluid communication with one of said inlet and outlet channels, and wherein each permanent magnet is provided with at least one longitudinal fluid circulation channel opening, on one side, onto said at least one front connecting channel, and, on the other side, onto the at least one rear connecting channel, said at least one longitudinal fluid circulation channel being configured to enable the circulation of a cooling fluid, and wherein each permanent magnet is formed by the assembly of at least two portions, respectively at least one outer portion and at least one inner portion, said at least one inner portion being accommodated inside said at least one outer portion, and said at least one longitudinal fluid circulation channel being delimited respectively by an inner peripheral surface of said at least one outer portion and by an outer peripheral surface of said at least one inner portion.

Thus configured, the rotor of the present disclosure could be cooled by a cooling fluid flowing successively through the rotor shaft from the inlet channel, then along one of the front and rear flanges, then through the permanent magnets, then along the other front and rear flange, before finally coming out through the outlet channel. Because of the direct contact of the cooling fluid with the permanent magnets, a better evacuation of the heat generated in the rotor during operation thereof could thus be obtained. The solution of the present disclosure also has the advantage of not requiring the presence of additional through cavities inside the lamination stack to ensure the circulation of the cooling fluid.

According to other features, the rotor of the present disclosure includes one or more of the following optional features considered separately or in combination:

the inner peripheral surface of said at least one outer portion of at least one of the permanent magnets is provided with ribs which are in contact with the outer peripheral surface of said at least one inner portion.

the outer peripheral surface of said at least one inner portion of at least one of the permanent magnets is provided with ribs which are in contact with the inner peripheral surface of said at least one outer portion.

for each permanent magnet, one of said inner or outer portions is formed of a matrix made of a thermoplastic material incorporating particles having magnetic properties and the other portion is obtained by sintering, or by 3D printing, or by a PIM process of particles having magnetic properties.

the particles having magnetic properties used for the formation of said at least one inner and/or outer portion are made of a material selected from among ferrite or a rare-earth element.

the matrix made of a thermoplastic material is made of a material selected from among polyamide 6 (PA 6), polyamide 6-6 (PA 6-6), polyamide 12 (PA 12), and polyphenylene sulfide (PPS).

said at least one front connecting channel is in fluid communication with said inlet channel and said at least one rear connecting channel is in fluid communication with said outlet channel, such that a cooling fluid intended for cooling the rotor could flow in the rotor successively throughout the inlet channel, then between the front flange and the front lateral face of the lamination stack throughout said at least one front connecting channel, then inside the permanent magnets throughout said longitudinal fluid circulation channels, then between the rear lateral face of the lamination stack and the rear flange throughout said at least one rear connecting channel, and finally throughout the outlet channel.

the shaft comprises a hollow front end portion and a hollow rear end portion separated from the front end portion by a solid central portion, the front end portion, respectively the rear end portion, being crossed by a cylindrical shaped central cavity, said central cavity forming the inlet channel, respectively the outlet channel, of the shaft, and in that at least one hole oriented radially with respect to the axis of the shaft is formed inside the front end portion, respectively the rear end portion, so as to open on one side into the inlet channel, respectively the outlet channel, and on the other side into said at least one front connecting channel, respectively said at least one rear connecting channel.

said at least one rear connecting channel is in fluid communication with said inlet channel and said at least one front connecting channel is in fluid communication with said outlet channel, such that a cooling fluid intended for cooling the rotor could flow in the rotor successively throughout the inlet channel, then between the rear flange and the rear lateral face of the lamination stack throughout said at least one rear connecting channel, then inside the permanent magnets throughout said longitudinal fluid circulation channels, then between the front flange and the front lateral face throughout said at least one front connecting channel, and finally throughout the outlet channel.

the shaft comprises a hollow front end portion and a solid rear end portion separated from the front end portion by a hollow central portion, the front end portion and the central portion being crossed by a cylindrical shaped central cavity, said central cavity forming the inlet channel of the shaft, the front end portion also being crossed by at least one peripheral cavity coaxially aligned with the central cavity, said at least one peripheral cavity forming the outlet channel of the shaft, and at least one hole oriented radially with respect to the axis of the shaft being formed inside the front end portion, respectively the central portion, so as to open on one side into the outlet channel, respectively the inlet channel, and on the other side into said at least one front connecting channel, respectively said at least one rear connecting channel.

the shaft comprises a main body provided with a blind hole aligned according to the axis of the shaft, said blind hole comprising two contiguous sections of different inner diameters, namely a first section having a first inner diameter and a second section having a second inner diameter, and an insert made of a plastic material being accommodated inside the blind hole at the level of the first section, said insert being formed of a tubular portion aligned with the second section of the blind hole and having an inner diameter that is substantially equal to the second inner diameter, and an annular portion extending radially around one of the ends of the tubular portion, said annular portion being positioned at the level of the interface between the first section and the second section of the blind hole and having an outer diameter that is substantially equal to the first inner diameter, the inlet channel of the shaft being defined jointly by the tubular portion of the insert and by the second section of the blind hole and the outlet channel of the shaft corresponding to the space delimited by the first section of the blind hole and by the tubular and annular portions of the insert.

the insert comprises one or several splitter fin(s) extending radially from the outer periphery of the tubular portion, each of the splitter fins being configured to separate the outlet channel into two or more outlet channel segment(s).

each of the front and rear flanges has an inner face in contact with a lateral face of the lamination stack, said inner face being provided with at least one radial groove, said at least one radial groove having a proximal end opening onto a recessed central area of said flange, at the level of which said at least one radial groove is in fluid communication with the inlet or outlet channel of the shaft, and said at least one radial groove being axially aligned with one of the permanent magnets and having substantially the same general shape as said permanent magnet in a plane perpendicular to the axis, so that said at least one longitudinal fluid circulation channel of said permanent magnet opens, on one side, into said at least one radial groove of the front flange and, on the other side, into said at least one radial groove of the rear flange.

at least two radial holes are formed throughout the shaft, each of said radial holes opens, on one side, onto the inlet or outlet channel of the shaft and, on the other side, onto the peripheral wall of the shaft, while being in fluid communication with the recessed central area of the front or rear flange.

The present disclosure also relates to an electric motor comprising a rotor as defined before.

BRIEF DESCRIPTION OF THE DRAWINGS

The present disclosure will be better understood upon reading the following non-limiting description, made with reference to the appended figures.

DETAILED DESCRIPTION

Figure 1:
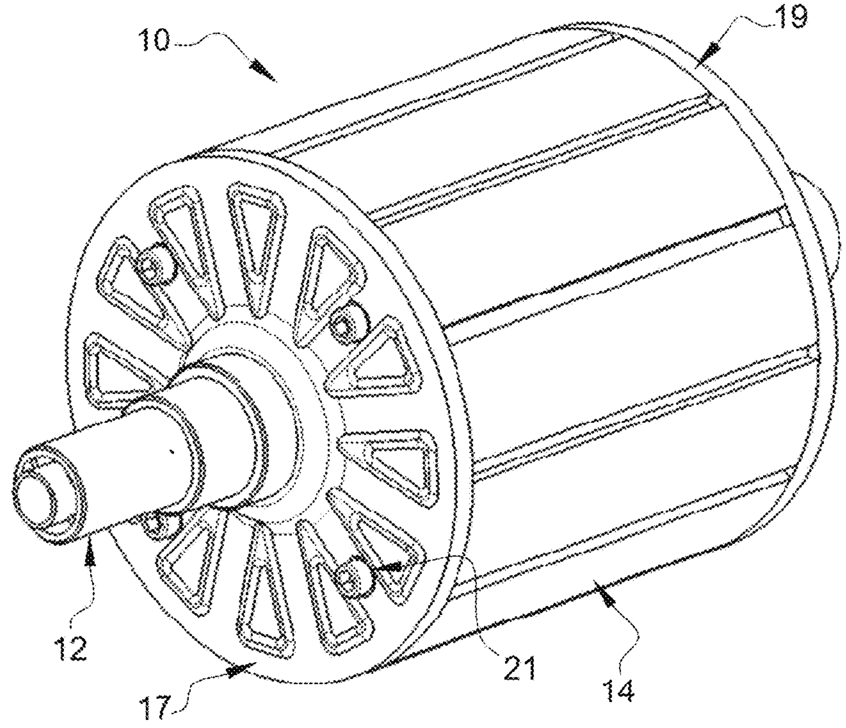
FIG. 1 is a perspective view of a rotor according to a first embodiment of the present disclosure.

Throughout the description and in the claims, the terms "axial" and "radial" and their derivatives are defined with respect to the axis of rotation of the rotor. Thus, an axial orientation relates to an orientation parallel to the axis of rotation of the rotor and a radial orientation relates to an orientation perpendicular to the axis of rotation of the rotor. Moreover, by convention, the terms "front" and "rear" refer to separate positions along the axis of rotation of the rotor. In particular, the "front" end of the shaft of the rotor corresponds to the end of the shaft on which a pulley, a pinion, a spline intended to transmit the rotational movement of the rotor to any other similar movement transmission device could be fastened.

FIGS. 1 to 4 show a rotor 10 according to a first embodiment of the present disclosure. The rotor 10 comprises a substantially cylindrical body formed by a lamination stack 14 made of a ferromagnetic material, in particular made of steel, said body being secured in rotation to a shaft 12 rotatably mounted about an axis X. The lamination stack 14 is mounted coaxially on the shaft 12. The shaft 12 could be force-fitted inside a central opening of the lamination stack 14 so as to rotatably link the body of the rotor to the shaft 12.

The lamination stack 14 is formed of an axial stack of laminations which extend in a radial plane perpendicular to the axis X of the shaft 12. A plurality of fastening holes 11 are formed in the lamination stack 14 to enable passage of fastening screws 21 of the laminations of the package. These fastening holes 11 are open-through so that it is possible to make a screw 21 pass inside each hole 11. A first end of the screws 21 bears against the outer face of a front end flange 17, whereas the other end of the screws protrudes from the outer face of a rear end flange 19 and is tapped so as to receive a nut which, once screwed, exerts a pressure against said outer face. Thus, the lamination stack 14 is clamped axially between the front end flange 17 and the rear end flange 19. Advantageously, these flanges 17, 19 could allow ensuring balancing of the rotor 10. Balancing of these flanges may be performed by adding or removing material. The removal of material may be performed by machining, whereas the addition of material may be performed by implanting elements in openings provided to this end and distributed along the circumference of the flange 17, 19.

Figure 3:
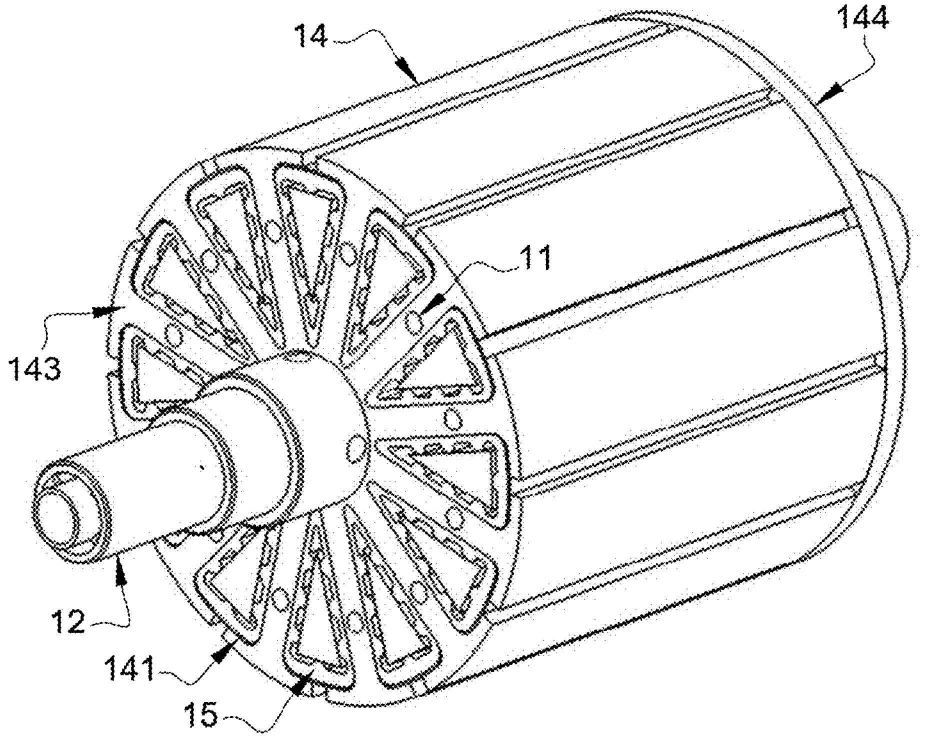
FIG. 3 is a view similar to FIG. 1, the front flange and the fastening screws of the rotor having been removed.
Figure 4:
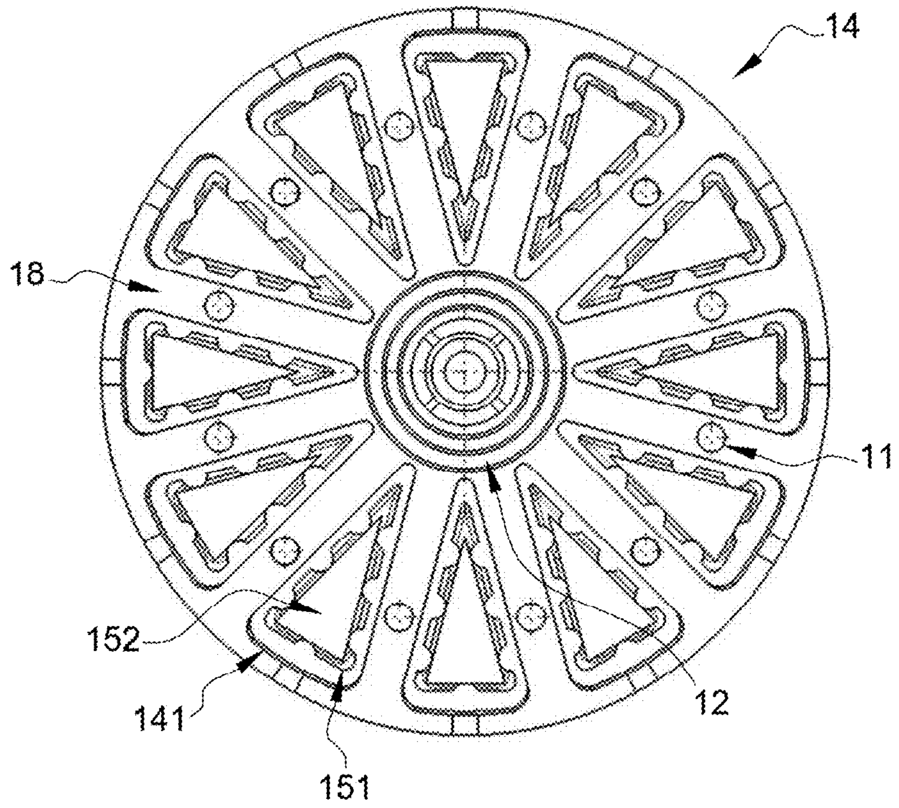
FIG. 4 is a front axial view of the rotor shown in FIG. 3.

As shown in FIGS. 3 and 4, the rotor 10 further comprises a plurality of permanent magnets 15 intended to be accommodated in a plurality of inner cavities 141 formed inside the lamination stack 14, each of the inner cavities 141 accommodating at least one permanent magnet 15. The cavities 141 extend according to a radial direction with respect to the axis X and are axially open-through. They have a substantially triangular section and are evenly distributed around the axis X. Two directly adjacent cavities 141 are separated by a radial segment 18 of the lamination stack 14 so that the body of the rotor consists of an alternation of cavities 141 and segments 18 along a circumference of the rotor 10. The permanent magnets 15 have an outer shape substantially complementary to that of the cavities 141, so that each permanent magnet 15 is tightly accommodated inside a cavity 141. The permanent magnets 15 have an orthoradial magnetization, that is to say that the two end faces of each permanent magnet 15 that are adjacent to each other in the orthoradial direction are magnetized so as to be able to generate a magnetic flux along an orthoradial orientation with respect to the axis X. Hence, the permanent magnets 15 located in two consecutive cavities 141 have alternating polarities. Thus disposed, the permanent magnets 15 generate in the lamination stack 14 a magnetic flux oriented radially and directed towards the outer periphery of the body of the rotor.

Figure 5A:
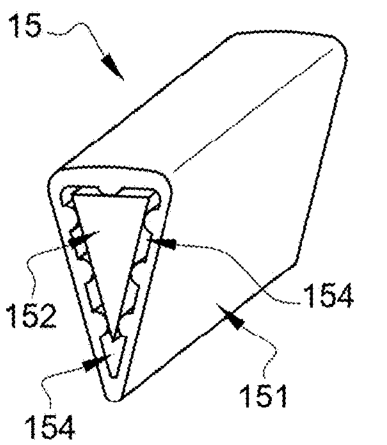
FIG. 5*a* is a perspective view of a permanent magnet equipping the rotor of FIG. 1.
Figure 5B:
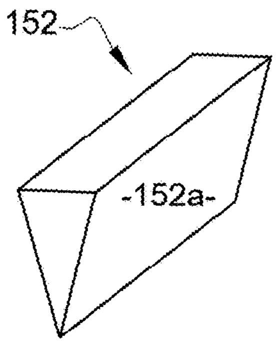
FIG. 5*b* is a perspective view of the inner portion of the permanent magnet of FIG. 5*a*.
Figure 5C:
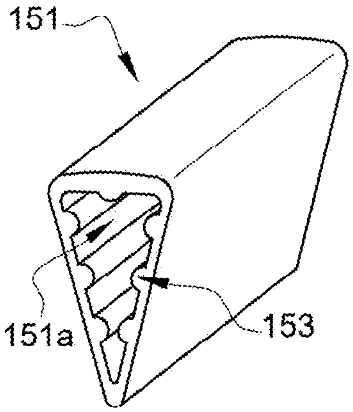
FIG. 5*c* is a perspective view of the outer portion of the permanent magnet of FIG. 5*a*.

In the embodiment shown in FIGS. 5*a* to 5*c*, each permanent magnet 15 is generally shaped as a right prism with a substantially triangular base.

In other embodiments (not shown) of the present disclosure, the permanent magnets 15 could also be generally shaped as a right prism with a trapezoidal or rectangular base, or of a cylindrical shape. Each permanent magnet 15 is formed by the assembly of two portions, respectively an outer portion 151 and an inner portion 152, the inner portion 152 being accommodated inside the outer portion 151. In the shown configuration, the inner portion 152 is solid and has a shape of a right prism shape with a triangular base, the vertices of the triangle being sharp, whereas the outer portion 151 is hollow and is shaped as a right prism with a triangular base, the vertices of the triangle being rounded. The outer and inner portions 151, 152 could be connected together by any known means, in particular by press-fitting, by gluing, by clipping or by welding. The outer portion 151 and the inner portion 152 could be formed either from a matrix made of a thermoplastic material incorporating particles having magnetic properties, i.e. from particles having magnetic properties which will be subjected to a sintering process, or 3D printing process, or PIM (Powder Injection Molding). In particular, a possible configuration could consist in using a thermoplastic matrix containing particles based on ferrite or rare-earth elements to form the outer portion 151 of the permanent magnet 15, the inner portion 152 being formed by sintering ferrite or rare-earth particles. Another possible configuration will consist in using a thermoplastic matrix containing ferrite or rare-earth particles to form the inner portion 152 of the permanent magnet 15, the outer portion 151 being formed by sintering ferrite or rare-earth particles. Another possible configuration will consist in using a thermoplastic matrix containing ferrite or rare-earth particles to form the inner portion 152 and the outer portion 151. In these three possible configurations, the thermoplastic matrix of the outer portion 151, respectively of the inner portion 152, may be made of a thermoplastic material of the polyamide 6 (PA 6) type, polyamide 6-6 (PA 6-6) type, polyamide 12 (PA 12) type, aromatic type or any other kind, or of polyphenylene sulfide (PPS).

As shown in FIG. 5*c*, the inner peripheral surface 151*a* of the outer portion 151 of each permanent magnet 15 is provided with ribs 153 which are intended to come into contact with the outer peripheral surface 152*a* of the inner portion 152, when the two portions are assembled together in the completed configuration of the permanent magnet 15 (cf. FIG. 5*a*). These ribs 153 create intermediate spaces 154 between the outer and inner portions 151, 152, said intermediate spaces 154 extending parallel to the longitudinal direction defined by the permanent magnet 15. Each intermediate space 154 is delimited respectively by the inner peripheral surface 151*a* of the outer portion 151 and by the outer peripheral surface 152*a* of the inner portion 152. As explained in the next paragraphs, these intermediate spaces 154 are configured to form fluid circulation channels inside the permanent magnets 15. Thus, these fluid circulation channels 154 will allow making a cooling fluid flow through the permanent magnets 15, which, ultimately, will allow evacuating the heat generated in the rotor 10 during operation thereof. The ribs 153 may have any possible shape. Moreover, in other variants of the present disclosure (not shown), it is possible to consider forming the ribs 153 at the level of the outer peripheral surface 152*a* of the inner portion 152 of the permanent magnets 15, said ribs 153 being in contact with the inner peripheral surface 151*a* of the outer portion 151.

Figure 6:
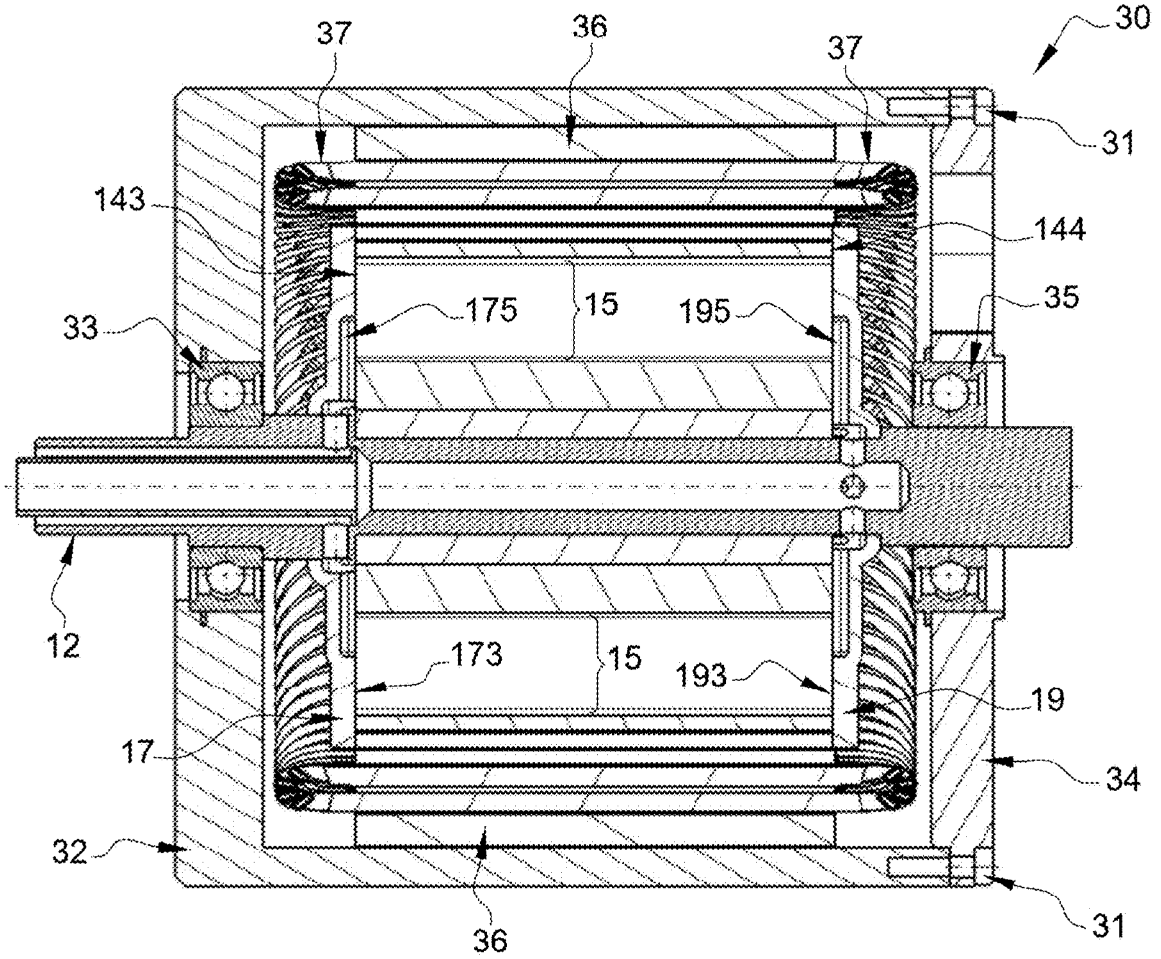
FIG. 6 is a longitudinal sectional view of an electric motor incorporating the rotor of FIG. 1.

Referring to FIG. 6, an electric motor 30 is shown equipped with the rotor 10 of FIG. 1. In particular, this electric motor 30 comprises a casing made into two portions accommodating the rotor 10 and an annular stator 36 which surrounds the rotor 10 coaxially with the shaft 12. In particular, the casing comprises a front bearing 32 and a rear bearing 34 connected to each other, for example by means of fastening screws 31. The bearings 32, 34 have a hollow shape and each centrally carrying a ball bearing, respectively 33 and 35, for rotatably mounting the shaft 12. Advantageously, the front and rear bearings 32, 34 will be made of metal. Winding buns 37 project axially on either side of the stator body 36 and are accommodated in the intermediate space separating the stator 36 from the respective bearings 32, 34.

As described before, the lamination stack 14 of the rotor 10 incorporates permanent magnets 15 each defining one or several longitudinal fluid circulation channel(s) 154. Each longitudinal channel 154 opens, at one of its ends, at the level of the front lateral face 143 of said lamination stack 14, and, at another one of its ends, at the level of the rear lateral face 144 of said lamination stack 14. Each of the front and rear lateral faces 143, 144 faces and is directly adjacent to an inner face 173, 193 of the front and rear flanges 17, 19 respectively.

Figure 11:
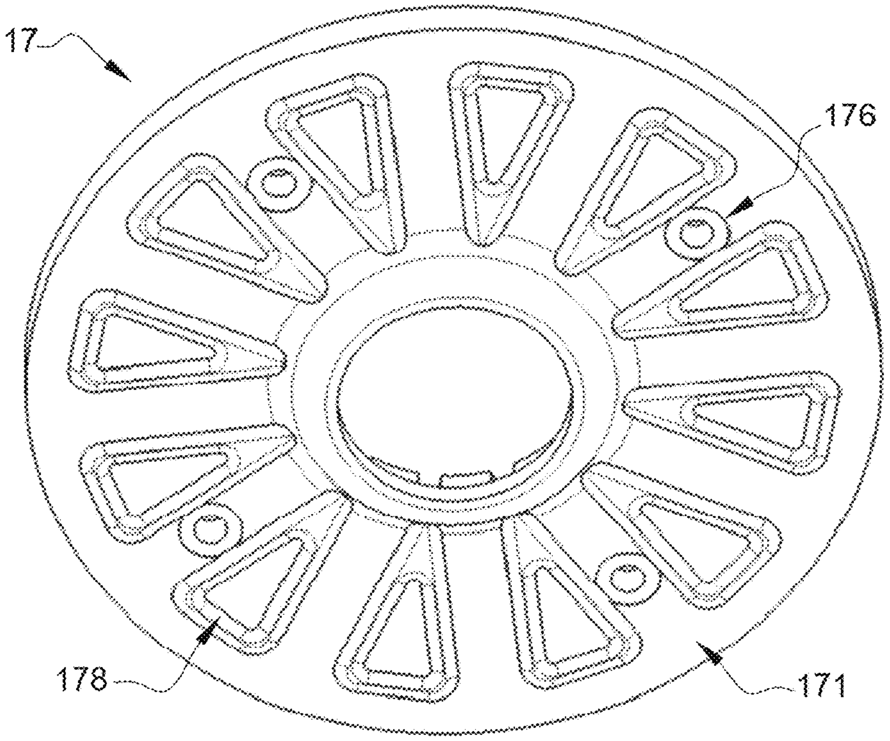
FIG. 11 is a perspective view of the outer face of the front flange used in the rotor of FIG. 1.
Figure 12:
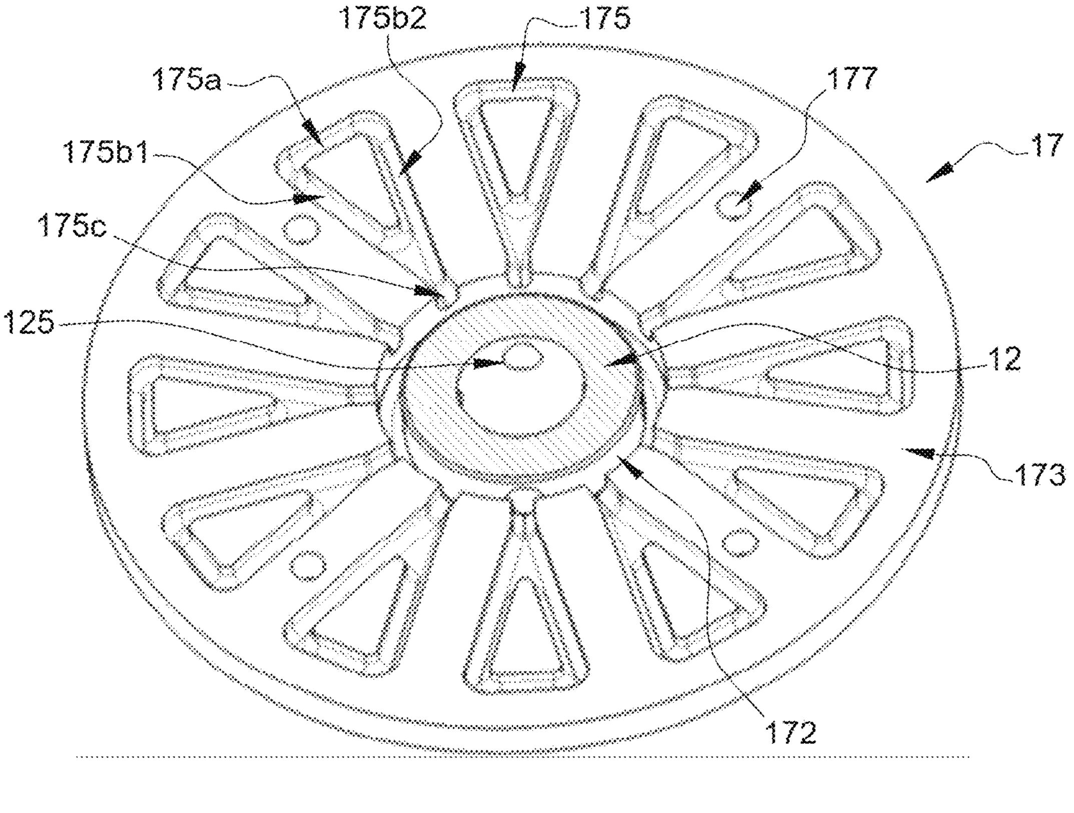
FIG. 12 is a perspective view of the inner face of the flange of FIG. 11, in which one end of the shaft has been shown in a truncated manner.
Figure 13:
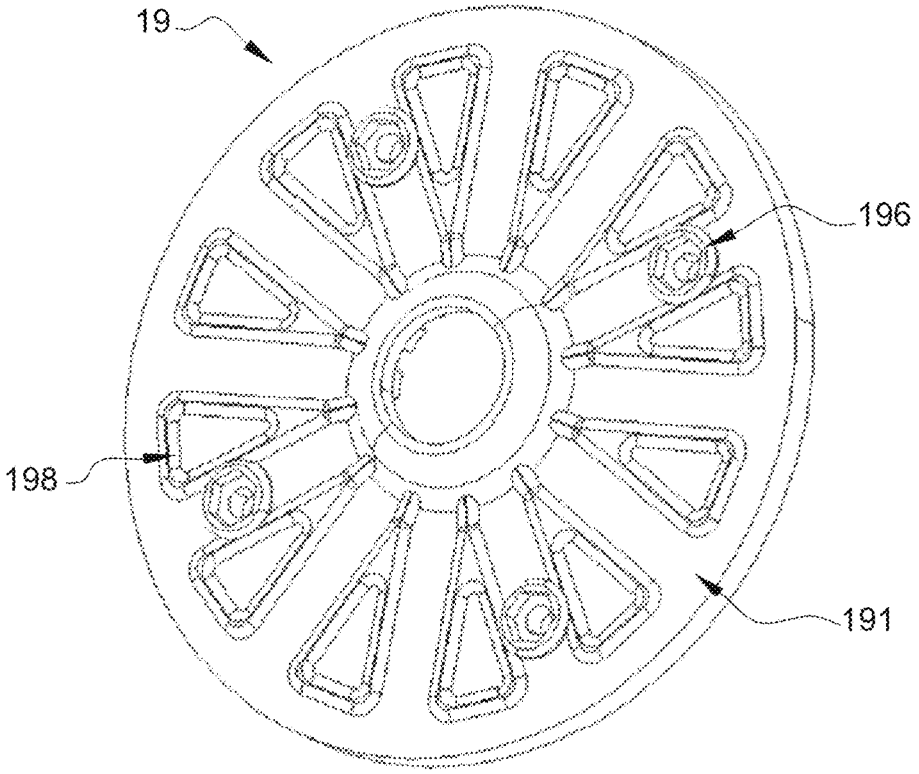
FIG. 13 is a perspective view of the outer face of the rear flange used in the rotor of FIG. 1.
Figure 14:
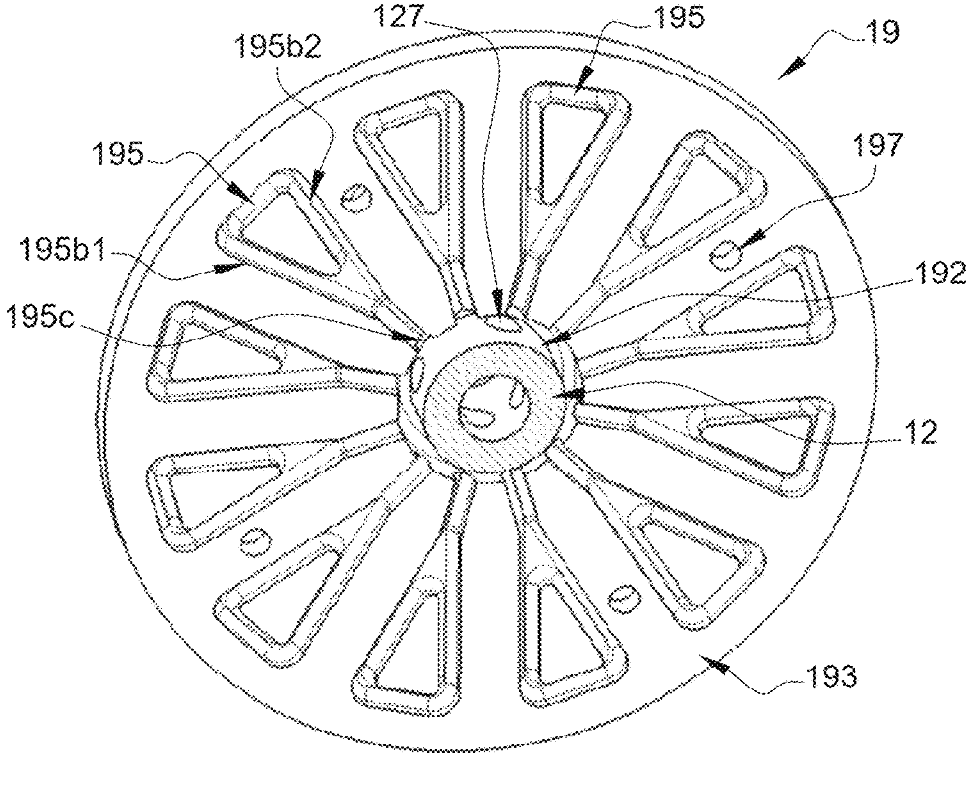
FIG. 14 is a perspective view of the inner face of the flange of FIG. 13, in which one end of the shaft has been shown in a truncated manner.

The outer and inner faces 171, 173 of the front flange 17 have been shown in FIGS. 11 and 12 respectively and the outer and inner faces 191, 193 of the rear flange 19 have been shown in FIGS. 13 and 14 respectively.

The front flange 17 is substantially in the form of a disk. The inner face 173 of the front flange 17 is in contact with the front lateral face 143 of the lamination stack 14. The inner face 173 is provided with a series of twelve oblong shaped grooves 175 extending radially from a recessed central area 172 of the front flange 17 up to an intermediate area of said flange, the twelve grooves 175 being shifted by an angle of 30° with respect to one another. The outer face 171 of the front flange 17 therefore has a series of twelve excrescences 178 matching the recessed shape of the underlying grooves 175. Moreover, cavities 176 with a circular section are provided at the level of the outer face 171, each of said cavities 176 being able to accommodate the head of a screw 21 intended to link the front and rear flanges 17, 19. A bore 177 is therefore formed throughout the front flange 17 to enable passage of the screw 21.

In particular, each of said radial grooves 175 of the front flange 17 is formed by an orthoradial section 175*a* extended at each of its ends by two oblique sections 175*b*1 and 175*b*2 forming an angle with said orthoradial section 175*a*, said oblique sections 175*b*1 and 175*b*2 joining at the level of a proximal end 175*c* which is adjacent to the central area 172. Thus, the radial grooves 175 have substantially the same general shape as the permanent magnets 15 in a plane perpendicular to the axis X. The radial grooves 175 open at the level of their proximal end 175*c* in a recessed central area 172 of the front flange 17 which is in fluid communication with holes 125 of the shaft 12 (cf. detailed description later on). In the mounted position of the front flange 17 (shown in FIG. 6), each radial groove 175 is axially aligned with one of the permanent magnets 15 so as to be in fluid communication with the longitudinal fluid circulation channel(s) 154 of said permanent magnet 15.

Similarly, the rear flange 19 is substantially in the form of a disk. The inner face 193 of the rear flange 19 is in contact with the rear lateral face 144 of the lamination stack 14. The inner face 193 is provided with a series of twelve oblong shaped grooves 195 extending radially from a recessed central area 192 of the rear flange 19 up to an intermediate area of said flange, the twelve grooves 195 being shifted by a 30° angle with respect to one another. The outer face 191 of the rear flange 19 therefore has a series of twelve excrescences 198 matching the recessed shape of the underlying grooves 195. Moreover, cavities 196 with a hexagonal section are provided at the level of the outer face 191, each of said cavities 196 being able to accommodate the nut of the screw 21 intended to link the front and rear flanges 17, 19. A bore 197 is therefore formed throughout the rear flange 19 to enable passage of the screw 21.

In particular, each of said radial grooves 195 of the rear flange 19 is formed by an orthoradial section 195*a* extended at each of its ends by two oblique sections 195*b*1 and 195*b*2 forming an angle with said orthoradial section 195*a*, said oblique sections 195*b*1 and 195*b*2 joining at the level of a proximal end 195*c* which is adjacent to the central area 192. Thus, the radial grooves 195 have substantially the same general shape as the permanent magnets 15 in a plane perpendicular to the axis X. The radial grooves 195 open directly, at the level of their proximal end 195*c*, into the recessed central area 192 of the rear flange 19 which is in fluid communication with holes 127 of the shaft 12 (cf. detailed description later on). In the mounted position of the front flange 19 (shown in FIG. 6), each radial groove 195 is axially aligned with one of the permanent magnets 15 so as to be in fluid communication with the longitudinal fluid circulation channel(s) 154 of said permanent magnet 15.

Thus, each longitudinal channel 154 of the permanent magnets 15 opens, on one side, into one of the radial grooves 175 of the front flange 17 and, on the other side, into one of the radial grooves 195 of the rear flange 19. By convention, the radial grooves 175 are thus so-called the front connecting channels and the radial grooves 195 are so-called the rear connecting channels.

Figure 2:
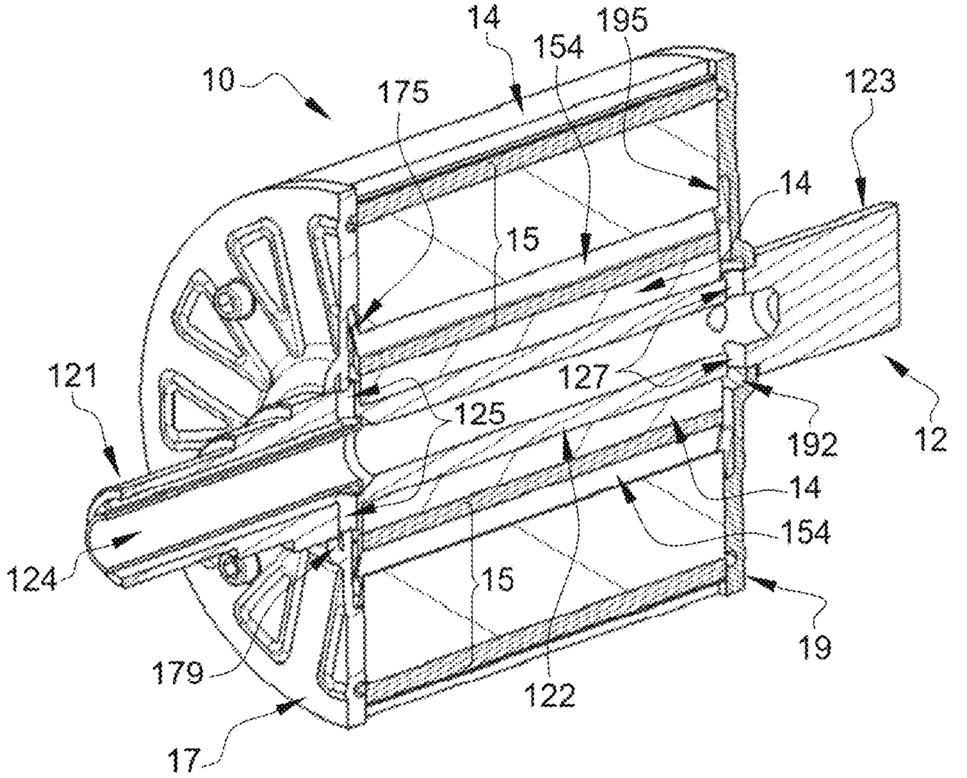
FIG. 2 is a perspective longitudinal sectional view of the rotor shown in FIG. 1.

As illustrated in FIG. 2, the front connecting channels 175 of the front flange 17 are in fluid communication, via the central area 172, with radial holes 125 formed through a front end portion 121 of the shaft 12 and the rear connecting channels 195 of the rear flange 19 are in fluid communication, via the central area 192, with radial holes 127 formed through a rear end portion 123 of the shaft 12. Thus, a fluid communication is achieved between the radial holes 125 of the shaft 12 and the longitudinal channels 154 of the permanent magnets 15 successively via of the central area 172 and of the radial grooves 175 of the front flange 17. Similarly, fluid communication takes place between the radial holes 127 of the shaft 12 and the longitudinal channels 154 of the permanent magnets 15 successively via the central area 192 and the radial grooves 195 formed at the level of the inner face 193 of the rear flange 19.

The circulation of the cooling fluid inside the rotor 10 of FIG. 1 will depend on the inner geometry of the shaft 12.

Figure 7:
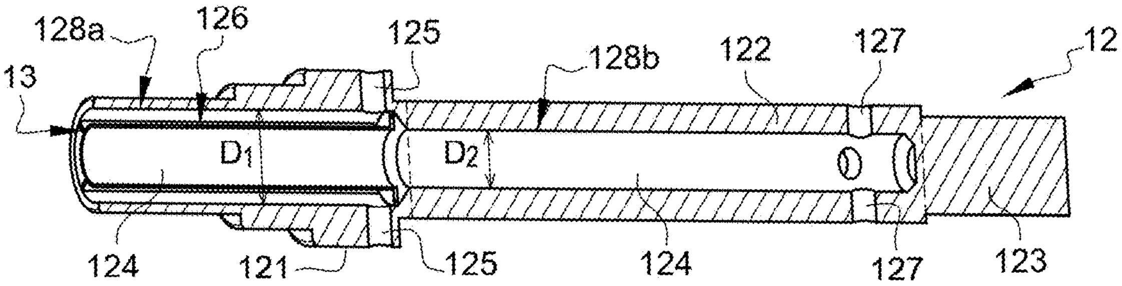
FIG. 7 is a longitudinal sectional view of the shaft equipping the rotor of FIG. 1.
Figure 8:
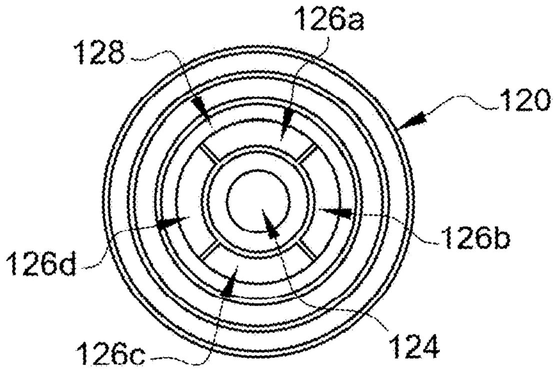
FIG. 8 is a front axial view of the shaft of FIG. 7.
Figure 9:
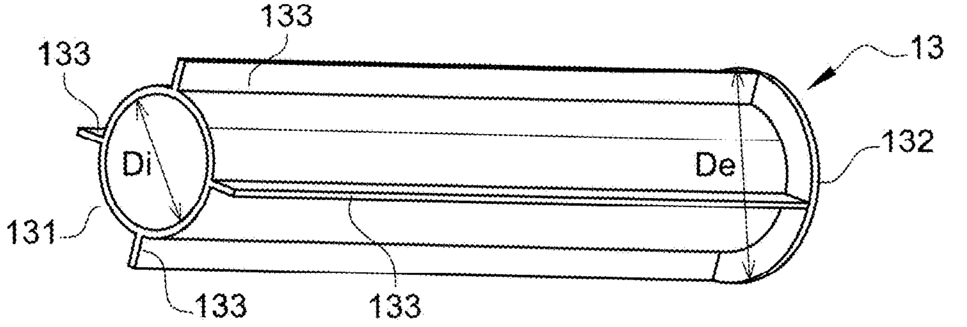
FIG. 9 is a perspective view of the insert used in the shaft of FIG. 7.

Thus, in the specific configuration shown in FIG. 2, the rotor 10 is equipped with a shaft 12 which is shown in detail in FIGS. 7 to 9. In this specific configuration, the shaft 12 comprises in particular a main body 120 formed by a front end portion 121 and a rear end portion 123, said front and rear end portions being separated by a central portion 122 (the central portion 122 is delimited by dotted lines in FIG. 7). The main body 120 is provided with a blind hole 128 aligned according to the axis X of the shaft 12. This blind hole 128 comprises two contiguous sections of different inner diameters, namely a first section 128*a* having an inner diameter D1 and a second section 128*b* having an inner diameter D2. An insert 13 made of a plastic material is accommodated inside the blind hole 128 at the level of the first section 128*a*. As shown in FIG. 9, this insert 13 is formed of a tubular portion 131, having an inner diameter Di substantially equal to the inner diameter D2, and an annular portion 132 extending radially around one of the ends of the tubular portion 131, said annular portion 132 having an outer diameter substantially equal to the inner diameter D1. Four fins 133 extend radially from the outer periphery of the tubular portion 131, said fins 133 being perpendicular to one another. Each of the fins 133 has a length such that its free end is tangential to the outer peripheral edge of the annular portion 132. When the insert 13 is fastened in the main body 120, its tubular portion 131 is aligned with the second section 128*b* of the blind hole 128 and its annular portion 132 is positioned at the level of the interface between the first section 128*a* and the second section 128*b* of the blind hole 128. Thus configured, the shaft 12 has a first channel 124, so-called the inlet channel, through which a cooling fluid intended to cool the rotor 10 can be conveyed, and at least one second channel 126, so-called the outlet channel, through which the cooling fluid can come out after having stored the heat originating from the permanent magnets 15 and from the lamination stack 14. The inlet channel 124 is formed jointly by the tubular portion 131 of the insert 13 and by the second section 128*b* of the blind hole 128. The outlet channel 126 is defined by the peripheral space surrounding the tubular portion 131 of the insert 13. Thus, the outlet channel 126 is delimited by the inner wall of the first section 128*a* of the blind hole 128 and by the tubular and annular portions 131, 132 of the insert 13. This outlet channel 126 is divided respectively into four outlet channel segments 126*a*, 126*b*, 126*c* and 126*d*, two directly adjacent segments being separated by a fin 133. Moreover, the shaft 12 is provided with four holes 125 oriented radially with respect to the axis X of the shaft 12, said holes 125 being formed inside the front end portion 121 so as to open, on one side, into one of the segments 126*a*-126*d* of the outlet channel 126 and, on the other side, in the central area 172 of the front flange 17 which communicates with the front connecting channels 175, as shown in FIG. 2. Similarly, four holes 127 oriented radially with respect to the axis X of the shaft 12 are formed inside the central portion 122 (as shown in FIG. 7) so as to open, on one side, into the inlet channel 124 and, on the other side, into the central area 192 of the rear flange 19 which communicates with the rear connecting channels 195.

Thus configured, the rotor 10 may be cooled by a cooling fluid, like oil for example, said cooling fluid flowing in the rotor successively throughout the inlet channel 124, then between the rear flange 19 and the rear lateral face 144 of the lamination stack 14 throughout the rear connecting channels 195, then inside the permanent magnets 15 throughout the longitudinal channels 154, then between the front flange 17 and the front lateral face 143 of the lamination stack 14 throughout the front connecting channels 175, and finally throughout the outlet channel segments 126*a*-126*d*.

Figure 10:
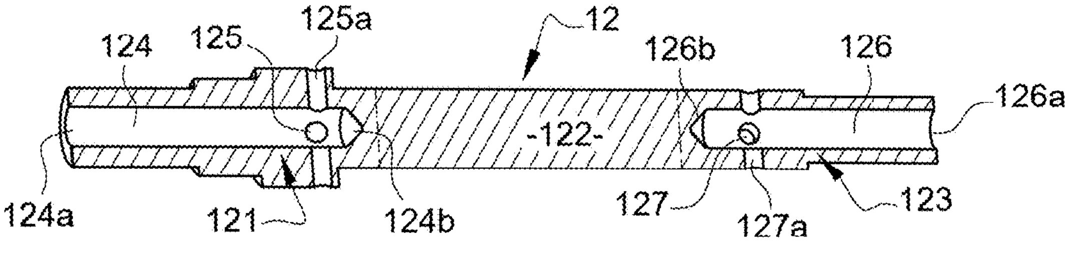
FIG. 10 is a longitudinal sectional view of a shaft equipping a rotor according to a second embodiment of the present disclosure.

Referring to FIG. 10, a variant of a shaft 12 that could equip a rotor according to the present disclosure is shown. In particular, this shaft 12 comprises a hollow front end portion 121 and a hollow rear end portion 123 separated from the front end portion 121 by a solid central portion 122 (the central portion 122 is delimited by dotted lines in FIG. 10). The front end portion 121 is crossed by a cylindrical shaped central cavity 124, said central cavity 124 having a front end 124*a* open onto the outside and a closed rear end 124*b*. Proximate to the rear end 124*b*, a series of four holes 125 oriented radially with respect to the axis X of the shaft 12 is formed, said holes 125 being shifted by 90° from one another. Each of the holes 125 has an end 125*a* radially distant from the central cavity 124 and open onto the outside. Thus, the front end portion 121 is configured to enable the entry of a flow of cooling fluid at the level of the front end 124*a* of the central cavity 124, and then circulating said cooling fluid throughout the central cavity 124 until reaching the radial holes 125, then throughout the radial holes 125 until reaching the ends 125*a* of the holes 125. Symmetrically, the rear end portion 123 is crossed by a cylindrical shaped central cavity 126, said cavity having a rear end 126*a* open onto the outside and a closed front end 126*b*. Proximate to the front end 126*b*, a series of four holes 127 oriented radially with respect to the axis X of the shaft 12 is formed, said holes 127 being shifted by 90° from one another. Each of the holes 127 has an end 127*a* radially distant from the central cavity 126 and open onto the outside. Thus, the rear end portion 123 is configured to enable the entry of a flow of cooling fluid at the level of the ends 127*a* of the radial holes 127, then the circulation of said cooling fluid throughout the radial holes 127 until reaching the central cavity 126, then throughout the central cavity 126 until reaching the rear end 126*a* of the central cavity 126.

In the following description, and by convention, the central cavity 124 will thus be so-called the cooling fluid inlet channel and the central cavity 126 will be so-called the cooling fluid outlet channel.

By equipping the rotor 10 of FIG. 1 with the shaft 12 of FIG. 10 instead of the shaft 12 of FIG. 7, it is thus possible to modify the path followed by the cooling fluid inside the rotor 10. In particular, the cooling fluid could flow in the rotor 10 successively throughout the inlet channel 124, then between the front flange 17 and the front lateral face 143 of the lamination stack 14 throughout the front connecting channels 175, then inside the permanent magnets 15 throughout the longitudinal fluid circulation channels 154, then between the rear lateral face 144 of the lamination stack 14 and the rear flange 19 throughout the rear connecting channels 195, and finally throughout the outlet channel 126 of the shaft 12.

Of course, the present disclosure is not limited to the embodiments as described before. In particular, in other embodiments (not shown) of the present disclosure, the number of inner cavities 141, of permanent magnets 15, of front and rear connecting channels 175, 195, could be other than twelve and the number of radial holes 125, 127 could be other than four.

Thus, a possible configuration of the present disclosure could consist of a rotor comprising two, or any multiple of two, inner cavities 141 disposed symmetrically with respect to the axis X of the shaft 12.

In another possible configuration of the present disclosure, the rotor may include three (or another odd number) inner cavities 141, said second inner cavities 141 being evenly distributed around the axis X in order not to create any imbalance for the rotor.

Preferably, the number of permanent magnets 15 and of front and rear connecting channels 175, 195 will be selected so as to be equal to the number of inner cavities 141.

In another possible configuration of the present disclosure, the rotor 10 of FIG. 1 could include an insert 13 with no splitter fins 133. Therefore, the outlet channel 126 would not be divided into outlet channel segments 126*a*-126*d*, but would consist of one single peripheral cavity coaxially aligned with the central cavity 124 formed by the tubular portion 131 of the insert 13.

The invention claimed is:

1. A rotor for an electric motor comprising:

a rotor shaft rotatably mounted about an axis;

a lamination stack coaxially mounted on the rotor shaft, the lamination stack comprising inner cavities symmetrical with respect to the axis of the shaft and therebetween, the inner cavities axially crossing an entirety of the lamination stack such that they open, at one of their ends, at a level of a front lateral face of the lamination stack and, at another one of their ends, at the level of a rear lateral face of the lamination stack;

a plurality of permanent magnets accommodated inside the inner cavities of the lamination stack;

a front flange and a rear flange coaxially mounted on the rotor shaft and arranged axially on either side of the lamination stack so as to be contiguous respectively with the front and rear lateral faces of the lamination stack;

wherein the shaft is provided with at least one first inner channel for the circulation of a cooling fluid, so-called an inlet channel, and at least one second inner channel for the circulation of a cooling fluid, so-called an outlet channel, and wherein the front flange, respectively the rear flange, is configured to form with the front lateral face, respectively the rear lateral face, of the lamination stack at least one front connecting channel, respectively at least one rear connecting channel, inside which a cooling fluid can flow, the at least one front, respectively rear, connecting channel being in fluid communication with one of the inlet and outlet channels, and wherein each permanent magnet is provided with at least one longitudinal fluid circulation channel opening, on one side, onto the at least one front connecting channel, and, on the other side, onto the at least one rear connecting channel, the at least one longitudinal fluid circulation channel being configured to enable the circulation of a cooling fluid, wherein each permanent magnet is formed by the assembly of at least two portions, respectively at least one outer portion and at least one inner portion, the at least one inner portion being accommodated inside the at least one outer portion, and in that the at least one longitudinal fluid circulation channel is delimited respectively by an inner peripheral surface of the at least one outer portion and by an outer peripheral surface of the at least one inner portion.

2. The rotor according to claim 1, wherein the inner peripheral surface of the at least one outer portion of at least one of the permanent magnets is provided with ribs which are in contact with the outer peripheral surface of the at least one inner portion.

3. The rotor according to claim 2, wherein the outer peripheral surface of the at least one inner portion of at least one of the permanent magnets is provided with ribs which are in contact with the inner peripheral surface of the at least one outer portion.

4. The rotor according to claim 3, wherein, for each permanent magnet, one of the inner or outer portions is formed of a matrix made of a thermoplastic material incorporating particles having magnetic properties and an other portion is obtained by sintering, or by 3D printing, or by a PIM process of particles having magnetic properties.

5. The rotor according to claim 4, wherein the particles having magnetic properties used for the formation of the at least one inner and/or outer portion are made of a material selected from among ferrite or a rare-earth element.

6. The rotor according to claim 5, wherein the matrix made of a thermoplastic material is made of a material selected from among polyamide 6, polyamide 6-6, polyamide 12, and polyphenylene sulfide.

7. The rotor according to claim 6, wherein the at least one front connecting channel is in fluid communication with the inlet channel and the at least one rear connecting channel is in fluid communication with the outlet channel, such that a cooling fluid intended for cooling the rotor could flow in the rotor successively throughout the inlet channel, then between the front flange and the front lateral face of the lamination stack throughout the at least one front connecting channel, then inside the permanent magnets throughout the longitudinal fluid circulation channels, then between the rear lateral face of the lamination stack and the rear flange throughout the at least one rear connecting channel, and finally throughout the outlet channel.

8. The rotor according to claim 1, wherein the outer peripheral surface of the at least one inner portion of at least one of the permanent magnets is provided with ribs which are in contact with the inner peripheral surface of the at least one outer portion.

9. The rotor according to claim 1, wherein, for each permanent magnet, one of the inner or outer portions is formed of a matrix made of a thermoplastic material incorporating particles having magnetic properties and an other portion is obtained by sintering, or by 3D printing, or by a PIM process of particles having magnetic properties.

10. The rotor according to claim 9, wherein the particles having magnetic properties used for the formation of the at least one inner and/or outer portion are made of a material selected from among ferrite or a rare-earth element.

11. The rotor according to claim 9, wherein the matrix made of a thermoplastic material is made of a material selected from among polyamide 6, polyamide 6-6, polyamide 12, and polyphenylene sulfide.

12. The rotor according to claim 1, wherein the at least one front connecting channel is in fluid communication with the inlet channel and the at least one rear connecting channel is in fluid communication with the outlet channel, such that a cooling fluid intended for cooling the rotor could flow in the rotor successively throughout the inlet channel, then between the front flange and the front lateral face of the lamination stack throughout the at least one front connecting channel, then inside the permanent magnets throughout the longitudinal fluid circulation channels, then between the rear lateral face of the lamination stack and the rear flange throughout the at least one rear connecting channel, and finally throughout the outlet channel.

13. The rotor according to claim 12, wherein the shaft comprises a hollow front end portion and a hollow rear end portion separated from the front end portion by a solid central portion, the front end portion, respectively the rear end portion, being crossed by a cylindrical shaped central cavity, the central cavity forming the inlet channel, respectively the outlet channel, of the shaft, and in that at least one hole oriented radially with respect to the axis of the shaft is formed inside the front end portion, respectively the rear end portion, so as to open on one side into the inlet channel, respectively the outlet channel, and on the other side into the at least one front connecting channel, respectively the at least one rear connecting channel.

14. The rotor according to claim 1, wherein the at least one rear connecting channel is in fluid communication with the inlet channel and the at least one front connecting channel is in fluid communication with the outlet channel, such that a cooling fluid intended for cooling the rotor could flow in the rotor successively throughout the inlet channel, then between the rear flange and the rear lateral face of the lamination stack throughout the at least one rear connecting channel, then inside the permanent magnets throughout the longitudinal fluid circulation channels, then between the front flange and the front lateral face throughout the at least one front connecting channel, and finally throughout the outlet channel.

15. The rotor according to claim 14, wherein the shaft comprises a hollow front end portion and a solid rear end portion separated from the front end portion by a hollow central portion, the front end portion and the central portion being crossed by a cylindrical shaped central cavity, the central cavity forming the inlet channel of the shaft, the front end portion also being crossed by at least one peripheral cavity coaxially aligned with the central cavity, the at least one peripheral cavity forming the outlet channel of the shaft, and in that at least one hole oriented radially with respect to the axis of the shaft is formed inside the front end portion, respectively the central portion, so as to open on one side into the outlet channel, respectively the inlet channel, and on the other side into the at least one front connecting channel, respectively the at least one rear connecting channel.

16. The rotor according to claim 15, wherein the shaft comprises a main body provided with a blind hole aligned according to the axis of the shaft, the blind hole comprising two contiguous sections of different inner diameters, namely a first section having a first inner diameter and a second section having a second inner diameter, and in that an insert made of a plastic material is accommodated inside the blind hole at a level of the first section-, the insert being formed of a tubular portion aligned with the second section of the blind hole and having an inner diameter that is substantially equal to the second inner diameter, and an annular portion extending radially around one end of the tubular portion, the annular portion being positioned at a level of an interface between the first section and the second section of the blind hole and having an outer diameter that is substantially equal to the first inner diameter, the inlet channel of the shaft being defined jointly by the tubular portion of the insert and by the second section of the blind hole and the outlet channel of the shaft corresponding to a space delimited by the first section of the blind hole and by the tubular and annular portions of the insert.

17. The rotor according to claim 16, wherein the insert comprises one or several splitter fin(s) extending radially from an outer periphery of the tubular portion, each of the splitter fins being configured to separate the outlet channel into two or more outlet channel segment(s).

18. The rotor according to claim 1, wherein each of the front and rear flanges has an inner face in contact with a lateral face of the lamination stack, the inner face being provided with at least one radial groove, the at least one radial groove having a proximal end opening onto a recessed central area of the flange, at a level of which the at least one radial groove is in fluid communication with the inlet or outlet channel of the shaft, and the at least one radial groove being axially aligned with one of the permanent magnets and having substantially the same general shape as the permanent magnet in a plane perpendicular to the axis, so that the at least one longitudinal fluid circulation channel of the permanent magnet opens, on one side, into the at least one radial groove of the front flange and, on the other side, into the at least one radial groove of the rear flange.

19. The rotor according to claim 18, wherein at least two radial holes are formed throughout the shaft, each of the radial holes opens, on one side, onto the inlet or outlet channel of the shaft and, on the other side, onto a peripheral wall of the shaft, while being in fluid communication with the recessed central area of the front or rear-flange.

20. An electric motor comprising a rotor according to claim 1.

* * * * *